US009384680B2

(12) United States Patent
Yang et al.

(10) Patent No.: US 9,384,680 B2
(45) Date of Patent: Jul. 5, 2016

(54) INTRAMUSCULAR INJECTION TRAINING MODEL

(71) Applicant: BT INC., Goyang-si (KR)

(72) Inventors: Seung-Jin Yang, Goyang-si (KR); Nam-Hyuk Kim, Goyang-si (KR); In-Bae Chang, Seoul (KR); Seung-Hun Jeung, Goyang-si (KR)

(73) Assignee: BT INC., Goyang-si (KR)

( * ) Notice: Subject to any disclaimer, the term of this patent is extended or adjusted under 35 U.S.C. 154(b) by 282 days.

(21) Appl. No.: 13/972,219

(22) Filed: Aug. 21, 2013

(65) Prior Publication Data
US 2014/0162232 A1 Jun. 12, 2014

(30) Foreign Application Priority Data

Dec. 6, 2012 (KR) .................. 10-2012-0141370
May 20, 2013 (KR) .................. 10-2013-0056678

(51) Int. Cl.
  G09B 23/28 (2006.01)
  G09B 23/34 (2006.01)
(52) U.S. Cl.
  CPC .............. G09B 23/285 (2013.01); G09B 23/34 (2013.01)
(58) Field of Classification Search
  CPC ...... G09B 23/28; G09B 23/285; G09B 23/30; G09B 23/32; G09B 23/34
  USPC .......................... 434/267, 268, 269, 262, 272
  See application file for complete search history.

(56) References Cited

U.S. PATENT DOCUMENTS

| 5,727,948 | A  | * | 3/1998  | Jordan          | 434/267   |
| 9,017,080 | B1 | * | 4/2015  | Placik          | 434/270   |
| 2004/0043369 | A1 | * | 3/2004 | Pawar et al.    | 434/267   |
| 2004/0126746 | A1 | * | 7/2004 | Toly            | 434/262   |
| 2008/0131855 | A1 | * | 6/2008 | Eggert et al.   | 434/266   |
| 2008/0227073 | A1 | * | 9/2008 | Bardsley et al. | 434/267   |
| 2010/0003657 | A1 | * | 1/2010 | Shibui et al.   | 434/267   |
| 2010/0055650 | A1 | * | 3/2010 | Bridges         | 434/84    |
| 2010/0203489 | A1 | * | 8/2010 | Koster          | 434/267   |
| 2013/0192741 | A1 | * | 8/2013 | Trotta et al.   | 156/61    |
| 2013/0266919 | A1 | * | 10/2013| Baker et al.    | 434/262   |
| 2014/0017650 | A1 | * | 1/2014 | Romero          | 434/270   |
| 2014/0120505 | A1 | * | 5/2014 | Rios et al.     | 434/219   |
| 2014/0180416 | A1 | * | 6/2014 | Radojicic       | 623/17.16 |
| 2015/0004584 | A1 | * | 1/2015 | Galibois et al. | 434/270   |

FOREIGN PATENT DOCUMENTS

| CN | 201465397 U | * | 5/2010 |
| JP | 2007-187626 A |   | 7/2007 |
| JP | 2009-508608 A |   | 3/2009 |
| KR | 10-2010-01222172 A |   | 11/2010 |
| WO | WO 2007/039148 A1 |   | 4/2007 |

* cited by examiner

Primary Examiner — Sam Yao
Assistant Examiner — Michael Humphrey
(74) Attorney, Agent, or Firm — NSIP Law

(57) ABSTRACT

A buttocks intramuscular injection training model is provided. The buttocks intramuscular injection training model includes a hip model having a similar shape to a human hip; injection modules inserted into both sides of the hip model and each being configured to comprise electrode layers to detect a needle and a muscle layer into which injection liquid is injected; a controller connected to the electrode layers to detect a location of the needle; and an input and output device wired or wireless connected to the controller for bidirectional communication with the controller and configured to visibly output the location of the needle.

2 Claims, 10 Drawing Sheets

INTRAMUSCULAR INJECTION TRAINING MODEL

CROSS-REFERENCE TO RELATED APPLICATION(S)

This application claims priority from Korean Patent Application Nos. 10-2012-0141370, filed on Dec. 6, 2012, and 10-2013-0056678, filed on May 20, 2013, in the Korean Intellectual Property Office, which are hereby incorporated by references for all purposes as if fully set forth herein.

BACKGROUND

1. Field

The following description relates to a buttocks intramuscular injection training model, and more particularly, to a buttocks intramuscular injection training model of a similar shape to a human hip and being capable of detecting a location and injection depth of a needle, thereby allowing a trainer who practices the intramuscular injection using the buttocks intramuscular injection training model to experience the same training effects as when administering an injection to a real human hip.

2. Description of the Related Art

Generally, an injection is conducted to put medication fluid into the body usually with a syringe, which is pierced through the skin into a muscle, a vein or an artery. The injection is carried out in various situations, such as, when immediate and accurate administration of medication is needed, when the patient is in such a condition that he/she cannot take the medication orally, when the medicine can be possibly destroyed by digestive juices or is difficult to be absorbed into the body, or when the medicine aggravates digestive mucous membrane.

Especially, an intramuscular injection are usually performed when the medicine is required to be absorbed into the body more quickly than when injected by a hypodermic injection, or when an intravenous injection is not possible. A usual intramuscular injection site is an area where muscles are well developed. More specifically, intramuscular injection sites may include the ventrogluteal in the buttocks including a part of a gluteus medius and a gluteus maximus, the dorsogluteal in the buttocks including the gluteus medius and gluteus minimum, musculus vastus lateralis, rectus femoris, and a deltoid muscle of the brachium, and the injection is most frequently performed on the ventrogluteal site and dorsogluteal site.

The injection site is a critical factor for the buttock intramuscular injection. Buttocks are favored injection sites where large blood vessels, bones and nerves are located close to one another, and thus it is required to carefully choose the injection site in order to avoid possible damage and complications. In performing a buttocks intramuscular injection, the depth of injection can be controlled to, generally, 2.5 cm to 3.8 cm. Injection at a wrong point or excessively deep injection may lead to damage and complications, such as damages of peripheral nerves of the body and resultant deformation of the nerves, embolism and other side effects caused by the injection of fluid into the blood vessel, necrosis, an abscess, persistent pain, periostitis, and the like. To prevent such damage and complications from improper intramuscular injection practices, it is important to repeatedly train the accurate injection operation.

As described above, the accurate intramuscular injection is a fundamental prerequisite for the safe medical treatment. To avoid damages from the incorrect intramuscular injection, medical practitioners need to train their injection skills. However, with the recent increase in awareness of the importance of patients' rights, students in medical education experience severe shortage of patients to whom to practice injection techniques, so that there are some medical graduates who are inserted into the practical clinical settings without obtaining sufficient practical skills and qualities required. Therefore, there is an increasing need for development and distribution of a buttock intramuscular injection training model. In this regard, many Korean medical universities and nursing institutes have established the simulation centers, and have actively introduced a clinical training education system employing simulated human body models. Yet, the simulated human body models used for the training are mostly imported from other countries, and buttock injection training models manufactured in Korea are only available for simple injection practices and unable to provide a training result, such as detection of a needle location and an excessively deep injection of a needle. Further, the imported models do not offer an evaluation function for objective evaluation of the training progress.

SUMMARY

The following description relates to a buttocks intramuscular injection training model, which allows a user to conduct intramuscular injection training under the similar conditions to the human hips, and thereby to obtain accurate knowledge on theory and be proficient in practices required in clinical settings to provide medical treatment to real patients, and thus to enhance the user's capabilities as a medical specialist.

In one general aspect, there is provided a buttocks intramuscular injection training model including: a hip model having a similar shape to a human hip; injection modules inserted into both sides of the hip model and each being configured to comprise electrode layers to detect a needle and a muscle layer into which injection liquid is injected; a controller connected to the electrode layers to detect a location of the needle; and an input and output device wired or wireless connected to the controller for bidirectional communication with the controller and configured to visibly output the location of the needle.

The hip model may include an inner member and an external member, the inner member includes accommodating grooves at both sides through which the injection modules are, respectively, inserted and projections at positions corresponding to anterior superior iliac spine, posterior superior iliac spine, iliac crest, and greater trochanter of a human body, and the external member is formed on a surface of the inner member to surround the inner member.

Each of the projections at positions corresponding to the anterior superior iliac spine, the posterior superior iliac spine, the iliac crest, and the greater trochanter of a human body may include a light emitting means installed therein.

Each of the injection modules may include a first electrode layer of a conductive material disposed at an outermost side of the injection module, an insulating layer attached to one side of the first electrode layer, a second electrode layer attached to one side of the insulating layer, and a muscle layer with pores attached to one side of the second electrode layer, and the controller may apply currents to both ends of the first electrode layer at different potentials, and detect voltage of the second electrode layer, thereby detecting a location of the needle.

Each of the injection module may further include a third electrode layer of a conductive material formed on one side of the muscle layer, and the controller may be connected to the third electrode layer to detect whether the needle is excessively deeply inserted while penetrating through the muscle layer.

The second electrode layer may include a first area that is a dorsogluteal site, a second area and a third area that are ventrogluteal sites, and a fourth area that is not included in any of the first to third areas, and the controller may measure voltage on each area to detect a location of the needle.

Other features and aspects will be apparent from the following detailed description, the drawings, and the claims.

Figure 1:
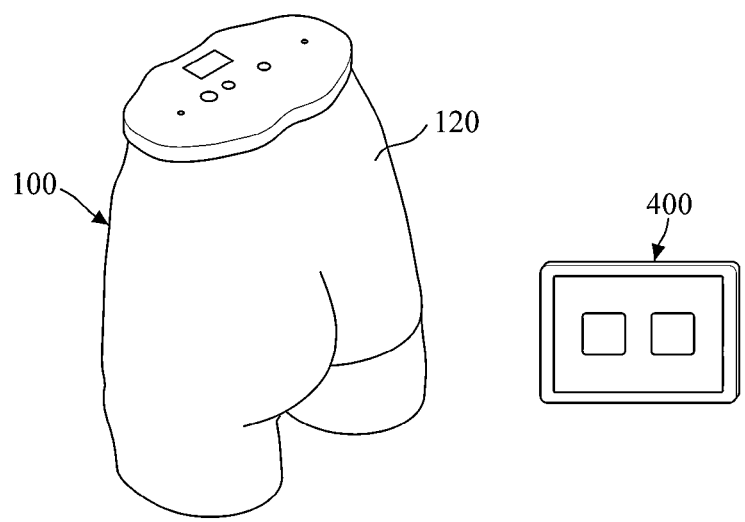
FIG. 1 is a perspective view illustrating a buttocks intramuscular injection training model according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
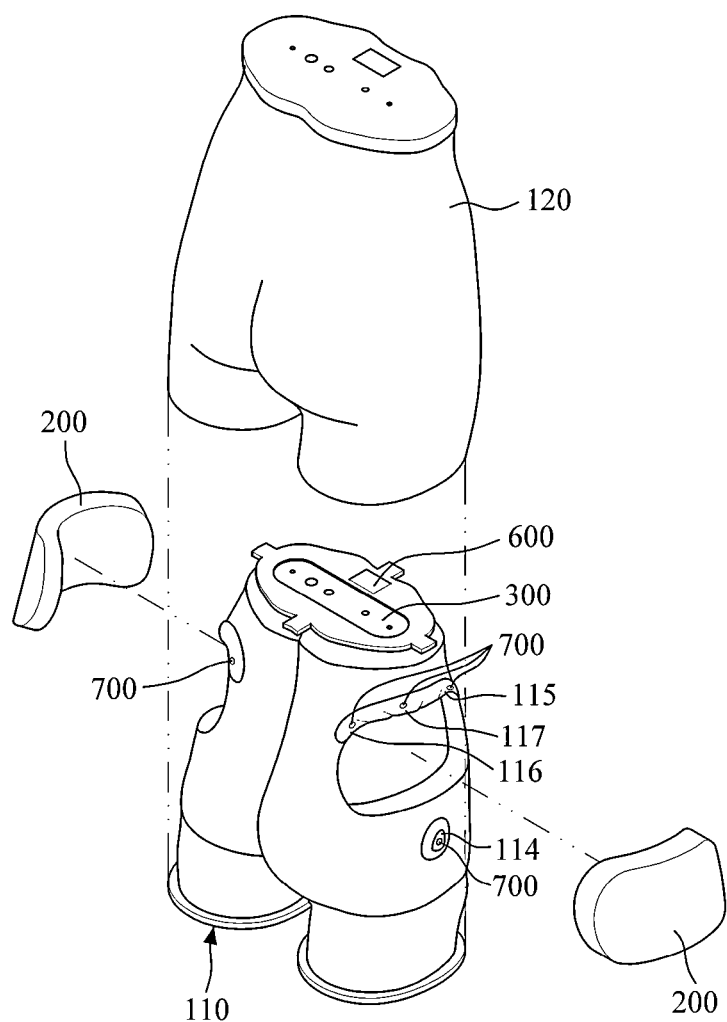
FIG. 2 is an exploded perspective view illustrating the buttocks intramuscular injection training model of FIG. 1.

FIG. 1 illustrates a perspective view of a buttocks intramuscular injection training model according to an exemplary embodiment of the present invention, and FIG. 2 illustrates an exploded perspective view of the buttocks intramuscular injection training model of FIG. 1.

Referring to FIGS. 1 and 2, a buttocks intramuscular injection training model includes a hip model 100 with a similar shape to a human hip, injection modules 200, a controller 300, and an input/output device 400. The injection modules are inserted into each side of the hip model 100 and each includes electrode layers 211, 213, and 215 (see FIG. 6) to detect a needle 11 and a muscle layer 214 (see FIG. 6) into which injection liquid is inserted. The controller 300 is electrically connected to the electrode layers 211, 213, and 215 to detect the location of the needle 11. The input/output device 400 is wired or wireless connected to the controller for bidirectional communications to visibly output the location of the needle 11.

The hip model 100 has a similar shape to the human hip, made of silicon resin or urethane resin to provide a user with skin-feel and friction similar to the real human skin during practicing the injection. The hip model 100 may have accommodating grooves 111 at each side to accommodate the injection modules, and each side thereof have projections at positions, respectively, corresponding to anterior superior iliac spine 115, posterior superior iliac spine 116, the iliac crest 117, and a simulated bone of greater trochanter 114.

The injection modules 200 are inserted into each side of the hip model 100 and each includes the electrode layers 211, 213, and 215 to detect the needle 11 and the muscle layer 214 into which the injection liquid is injected.

Generally, a syringe 10 for hip intramuscular injection training has a capacity of 3 to 5 ml and the needle 11 with a thickness of 20 to 23 gauge and a length of 1 to 1.5 inches.

The controller 300 detects the location and injection depth of the needle 11, and outputs the detected information to the input/output device 400 in a wired or wireless manner.

The input/output device 400 receives information regarding the location and injection depth of the needle 11 from the controller 300 and displays the received information in GUI form. In addition, the input/output device 400 compares the received information with an ideal injection site and represents the accuracy of the injection of the needle 11 visibly and numerically. The user may learn how to conduct hip intramuscular injection practice and how to determine the injection site, and also can increase the efficiency of learning with the help of animations and video functions of the input/output device 400.

Figure 8:
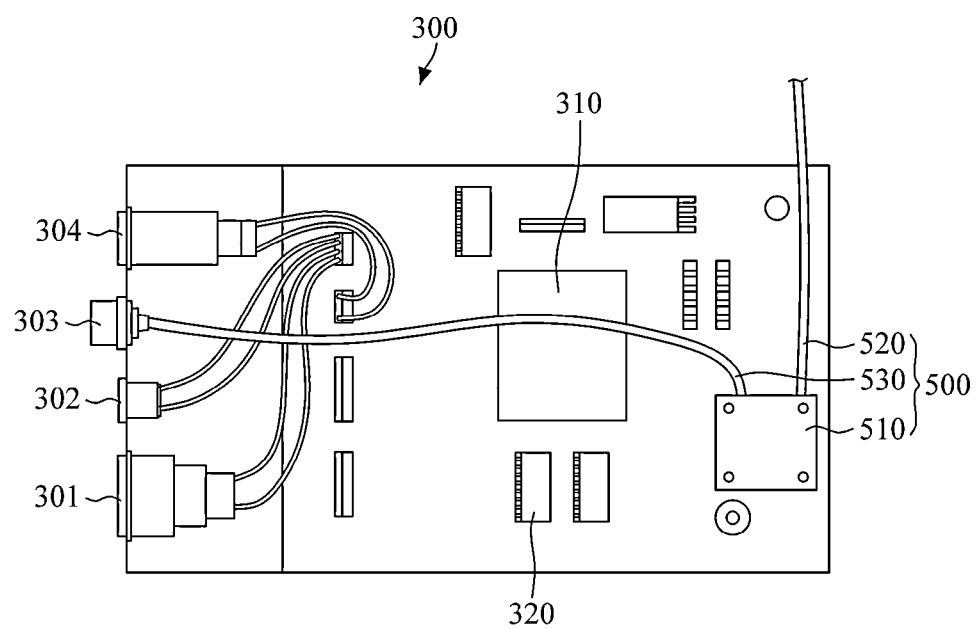
FIG. 8 is a front view illustrating a controller according to an exemplary embodiment of the present invention.

FIG. 8 illustrates a front view of a controller according to an exemplary embodiment of the present invention. The controller 300 may include a power switch 301, a power connector 302, and a water drain switch 304 and a water drain connector 303 which are provided to control a drain module 500. Further, the controller 300 may include a microprocessor 310 inside that measures a potential difference between the electrode layers 211, 213, and 215, to detect the information regarding the location and injection depth of the needle 11. In addition, the controller 300 may include a pump 510 to discharge injection liquid from the muscle layer 214 after the user completes practicing the injection of a given amount of the liquid.

Figure 10:
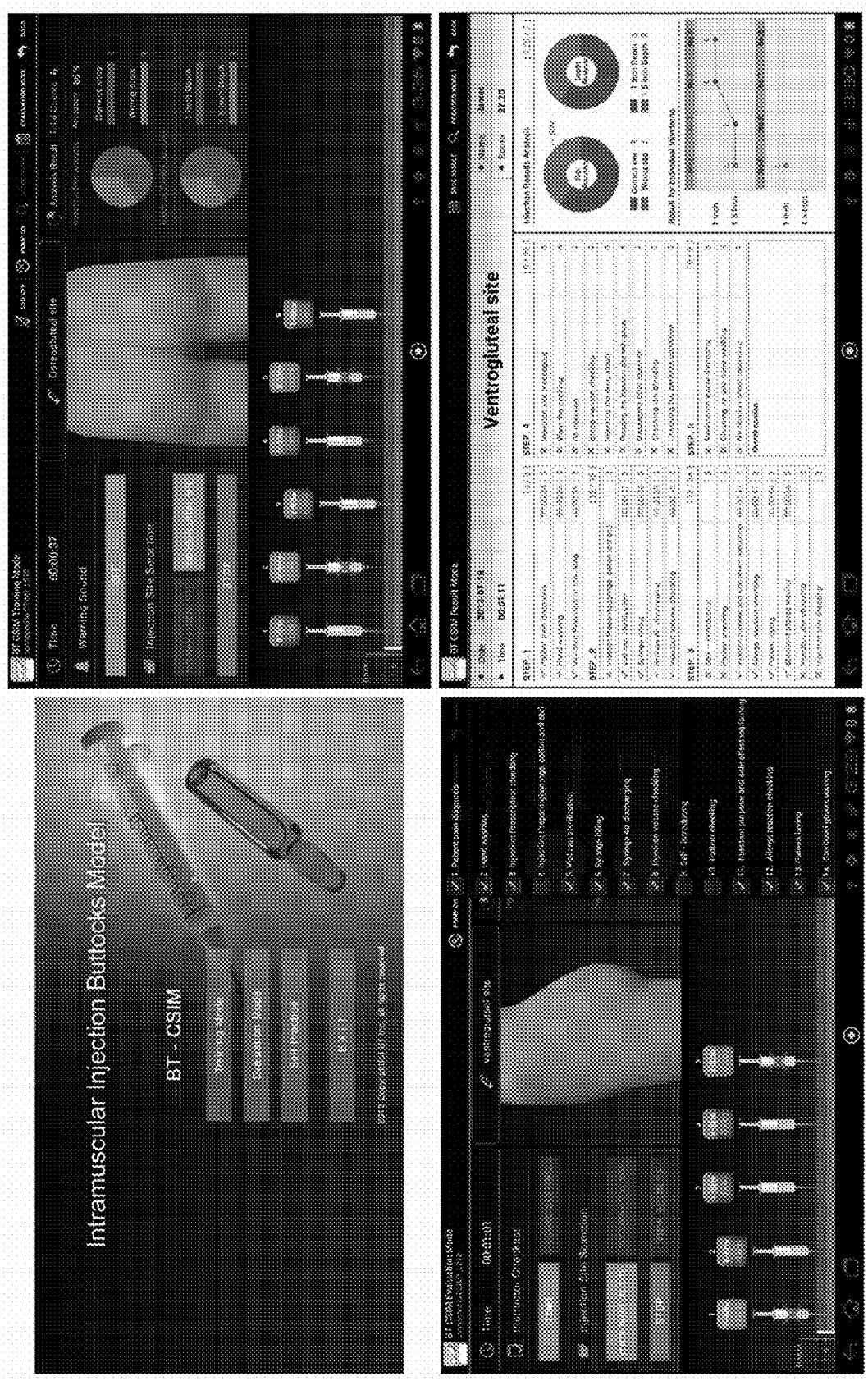
FIG. 10 is a diagram showing a program interface used for an input/output device according to an exemplary embodiment of the present invention.

FIG. 10 illustrates a diagram showing a program interface used for an input/output device according to an exemplary embodiment of the present invention. The program interface consists of training mode and evaluation mode, wherein the training mode enables the user to conduct self-learning and trainings and the evaluation mode enables the user to evaluate an injection method selected from the ventrogluteal injection and dorsogluteal injection methods.

The injection methods suitable for ventrogluteal sites may include a method in which the user first palpates the greater trochanter using the palm with the index finger pointing to the anterior superior iliac spine and the middle finger placing the iliac crest and injects at a site between the anterior superior iliac spine and the iliac crest, and a method in which the user palpates the anterior superior iliac spine with one hand and the posterior superior iliac spine with the other hand, then divides an area between the palpated spines into exactly three sections, and gives the injection at the ⅓ site close to the anterior superior iliac spine. As an injection method suitable for a dorsogluteal site, the user palpates the greater trochanter, then palpates the posterior superior iliac spine, draws an imaginary line between the greater trochanter and the posterior superior iliac spine, and administers the injection in the upper outer portion above the imaginary line.

In training mode, animation and video functions are added to increase the efficiency of learning, and explanations of each injection method and intramuscular injection training process are provided to maximize the self-learning effect. When the user practices the injection with the needle 11, a practice training screen displays the correct injection point of each method and numerically displays the accuracy of the user's injection. In addition, excessively deep injection is detected and displayed to show the training result, which can be stored. When practicing the injection with the needle 11, a training evaluation screen provides the user with the correct injection site of each method and the numerically represented accuracy of the injection, and enables the user to check whether to insert the needle excessively deeply or not and whether to follow the practice process, and to store the training result.

In one example, the hip model 100 includes the accommodating grooves 111, a mounting groove 200, a battery slot 113, an inner member 110, and an external member 120. The accommodating grooves 111 are formed at both sides of the hip model 100 to accommodate the injection modules 200, the mounting groove 112 is formed on a top portion of the hip model 100, allowing the controller 300 to be inserted therethrough, and the battery slot 113 is also formed on the top portion of the hip model 100 to accommodate a battery. The inner member 110 has projections at positions corresponding to the anterior superior iliac spine 115, the posterior superior iliac spine 116, the iliac crest 117, and the greater trochanter 114 on the upper thigh, and the external member 120 is disposed on the surface of the inner member 110 to surround the inner member 110.

The anterior superior iliac spine 115 is a bony projection which is the uppermost end at the front of the pelvis bone, the posterior superior iliac spine 116 is a bony projection which is the uppermost end at the rear of the pelvis bone, and the iliac crest 117 is a protruding point of the ilium, which is the uppermost border of the ilium as a part of the pelvic girdle.

The projections at positions corresponding to the anterior superior iliac spine 115, the posterior superior iliac spine 116, the iliac crest 117, and the greater trochanter 114 are essential for finding the correct ventrogluteal and dorsogluteal injection sites on the buttocks.

In one example, the projections at positions corresponding to the anterior superior iliac spine 115, the posterior superior iliac spine 116, the iliac crest 117, and the greater trochanter 114 may each include a light emitting means 700. The light emitting means 700 may be implemented as a variety of light emitting device that can be recognized by the user. For example, the light emitting means 700 may be a high-brightness light emitting diode (LED). The light emitting means 700 on the projections corresponding to the anterior superior iliac spine 115, the posterior superior iliac spine 116, the iliac crest 117, and the greater trochanter 114 may assist the user in palpating the corresponding bony projections while visibly identifying them. The light emitting means 700 may be turned on or off by the input/output device 400, and contribute to an increase in the learning effect by providing visible indications of the locations and shapes of the corresponding bones.

In a case where the light emitting means 700 are disposed on the respective anterior superior iliac spine 115, posterior superior iliac spine 116, iliac crest 117 and greater trochanter 114, which are included in the inner member 110, light from the light emitting means 700 may be blocked by the external member 120 and not transmitted. Hence, to avoid this failure of light transmission, the external member 120 may have through-holes to allow the light from the light emitting means 700 to pass through to the outside or may be made of material with transparency. In other examples, the light emitting means 700 may be disposed on the external member 120 at positions corresponding to the anterior superior iliac spine 115, the posterior superior iliac spine 116, the iliac crest 117, and the greater trochanter 114.

Figure 3:
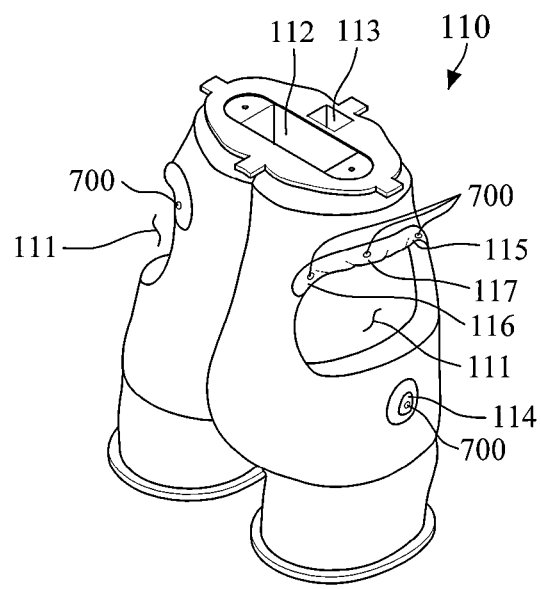
FIG. 3 is a perspective view illustrating a hip model according to an exemplary embodiment of the present invention.

FIG. 3 illustrates a perspective view of a hip model according to an exemplary embodiment of the present invention. As described above, the hip model 100 includes the inner member 110 and the external member 120. The inner member 110 may be formed in the same shape as a human body part including the human waist, buttocks and thighs, and made of material, such as plastic, sponge, and urethane foam. The inner member 110 includes the accommodating grooves 110 at both sides, through which the injection modules 200 are inserted, and the projections at positions corresponding to the anterior superior iliac spine 115, the posterior superior iliac spine 116, the iliac crest 117, and the greater trochanter 114. In addition, the inner member 110 includes the mounting groove 112 at the top portion, where the controller 300 is mounted, and the battery slot 113 into which the battery 600 is placed to operate the controller 300 and the pump 510. The buttocks intramuscular injection training model can operate by AC power or battery.

The external member 120 may be detachably disposed on the surface of the inner member 110 to surround the inner member 110, and may be made of silicon resin or urethane resin to provide the user with skin-feel and friction similar to the real human skin during practicing the injection.

Figure 6:
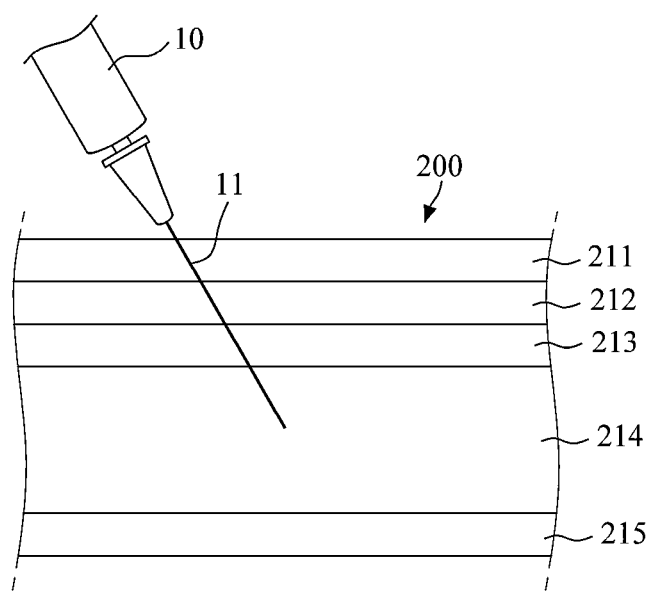
FIG. 6 is a cross-sectional view illustrating an injection module according to an exemplary embodiment of the present invention.

FIG. 6 illustrates a cross-sectional view of an injection module according to an exemplary embodiment of the present invention. Referring to FIG. 6, the injection module 200 includes a first electrode layer 211 of a conductive material, which is disposed at the outermost side of the injection module 200, an insulating layer 212 attached to a surface of the first electrode layer 211, a second electrode layer 213 of a conductive material, attached to a surface of the insulating layer 212, and the muscle layer 214 attached to a surface of the second electrode layer 213 and having pores inside. The controller 300 applies currents to both ends of the first electrode layer 211 at different potentials, and measures voltage at both ends of the second electrode layer 213 to detect the location of the needle 11.

The injection module 200 includes the first electrode 211, the insulating layer 212, and the second electrode layer 213 to detect the location and depth of the needle 11 when the syringe 10 is inserted, and further includes the muscle layer 214 below the second electrode layer 213 into which injection liquid is injected.

The first electrode layer 211 and the second electrode layer 213 may be formed of various forms of conductive materials, such as conductive silicon and conductive fabric. The thickness of the conductive material of each electrode layer may be between 0.2 mm and 1 mm so as to reduce resistance during insertion of the syringe 10. In addition, the resistance value of the conductive material may be between 10 Ω~100 kΩ in the longitudinal direction. The muscle layer 214 is a place where the injection liquid of the syringe 10 is injected, and may be formed with a material that produces resistance when the syringe 10 is inserted and pulled back. For example, the muscle layer 214 may be made of a porous material with a number of pores to allow the injection liquid from the syringe to be injected, and the material may be silicone foam or urethane foam, which has properties similar to human muscle.

In addition, the controller 300 applies currents to both ends of the first electrode layer 211 at different potentials, and measures voltages at both ends of the second electrode layer 213, whereby the insertion of the needle 11 can be detected by measuring the voltage of the second electrode layer 213 when the needle 11 penetrates the first and second electrode layers 211 and 213.

In one example, the electrode pad 210 further includes the third electrode layer 215 of a conductive material formed on one surface of the muscle layer 214, and the third electrode layer 215 is connected to the controller 300 which detects whether the needle 11 is excessively deeply inserted by measuring the voltage of the third electrode layer 215, when the needle 11 passes through the muscle layer 214 and penetrates the third electrode 215, and displays the detection result to the input/output device 400. The third electrode layer 215 may be formed of a conductive material, such as conductive silicon or conductive fabric with the same conditions as the first and second electrode layers 211 and 213.

Figure 7:
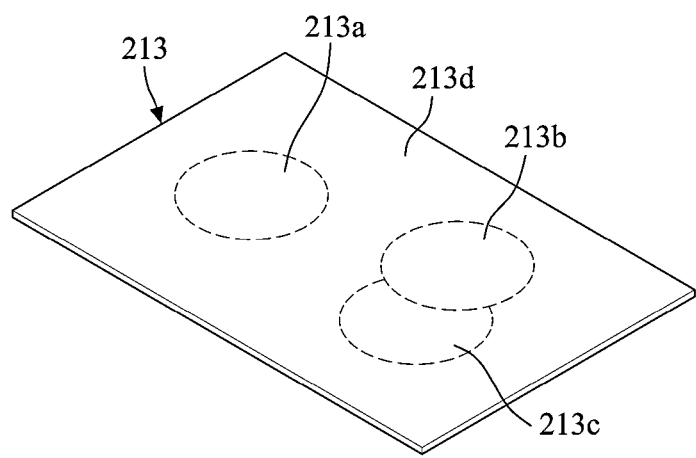
FIG. 7 is a perspective view illustrating the second electrode layer of FIG. 6.

FIG. 7 illustrates a perspective view of the second electrode layer of FIG. 6. In one example, the second electrode layer 213 includes a first area 213a that is the dorsogluteal site, a second area 213b and a third area 213c which are the ventrogluteal sites, and a fourth area 213d that is not included in any of the first to third areas 213a to 213c. The controller 300 may detect the location of the needle 11 by measuring voltages at the areas 213a, 213b, 213c, and 213d. In the case of measuring the voltage on each area, it is possible to evaluate the intramuscular injection to each of the ventrogluteal site and the dorsogluteal site. In addition, when the voltage is detected at the fourth area 213d, it may be determined that the needle 11 is injected at a wrong location.

The second area and the third area may be formed separately or integrally.

The injection methods suitable for ventrogluteal sites may include a method in which the user first palpates the greater trochanter using the palm with the index finger pointing to the anterior superior iliac spine and the middle finger placing the iliac crest and injects at a site between the anterior superior iliac spine and the iliac crest, and a method in which the user palpates the anterior superior iliac spine with one hand and the posterior superior iliac spine with the other hand, then divides an area between the palpated spines into exactly three sections, and gives the injection at the ⅓ site close to the anterior superior iliac spine. As an injection method suitable for a dorsogluteal site, the user palpates the greater trochanter, then palpates the posterior superior iliac spine, draws an imaginary line between the greater trochanter and the posterior superior iliac spine, and administers the injection in the upper outer portion above the imaginary line.

Figure 4:
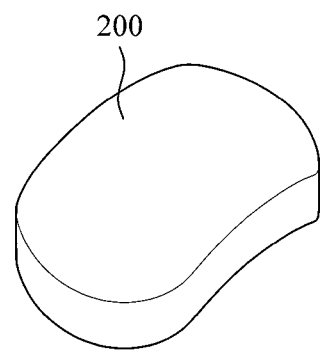
FIG. 4 is a perspective view illustrating an injection module according to an exemplary embodiment of the present invention.
Figure 5:
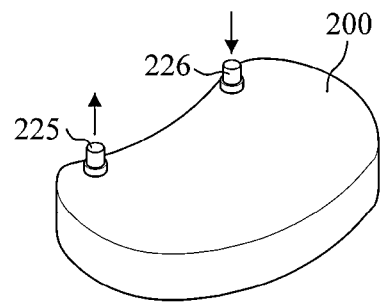
FIG. 5 is a rear perspective view illustrating the injection module of FIG. 4.

FIG. 4 illustrates a perspective view of an injection module according to an exemplary embodiment of the present invention, and FIG. 5 illustrates a rear perspective view of the injection module of FIG. 4.

Referring to FIGS. 4 and 5, the injection module 200 includes a drain outlet 225 passing therethrough to allow the injection liquid to be discharged from the muscle layer 214, and the drain module 500 is mounted thereon, which includes the pump 510 connected to the controller 300, an introduction tube 520 that connects the pump 510 and the drain outlet 225 to transfer the injection liquid from the muscle layer 214 to the pump 510, and a drain tube 530 to discharge the injection liquid from the pump 510 to the outside. The injection module 200 may further include an inlet 226 passing therethrough to allow air from the outside to enter into the pump 510, or the drain outlet 225 may function as the inlet.

The injection module 200 may be sealed to prevent the injection liquid injected into the muscle layer 214 from leaking from the injection module 200, and have the drain outlet 225 at the back to discharge the injection liquid. The drain outlet 225 functions as a passage through which the injection liquid in the muscle layer 214 flows out to the injection module 200, and is connected to the introduction tube 520 to transfer the discharged injection liquid to the pump 510, which discharges the injection liquid to the outside through the drain tube 530.

Figure 9:
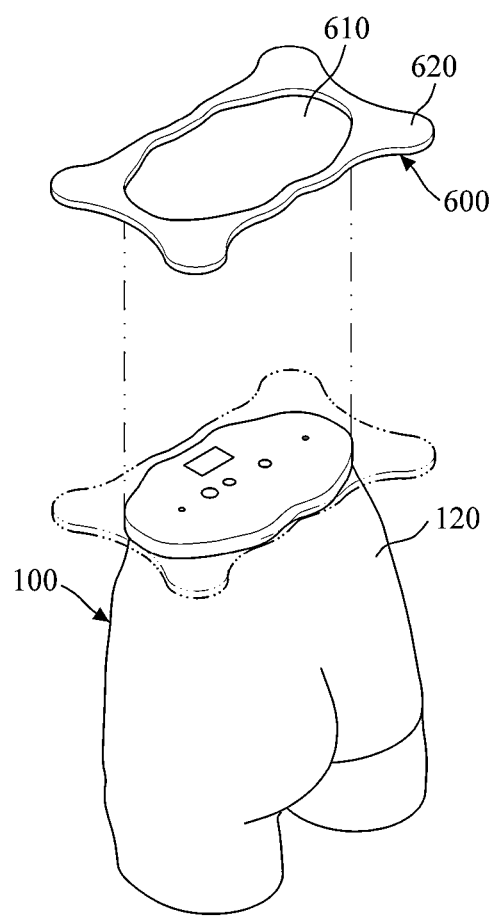
FIG. 9 is an exploded perspective view illustrating the hip model of FIG. 1 and a supporting member.

FIG. 9 illustrates an exploded perspective view of the hip model of FIG. 1 and a supporting member. Referring to FIG. 9, the supporting member 600 is to be coupled to an upper part of the hip model 100. The supporting member 600 includes a hollow portion 610 with a hole of the same shape as a cross-section of the hip model 100 to allow the hip model 100 to be inserted, and a plurality of protruding parts 620, each of which projects outwardly from the hollow portion 610. The hip model 100 being inserted into the hollow portion 610 is placed on the ground with being supported by the protruding parts 620, and varies in its position for the injection training.

As described above, the buttocks intramuscular injection training model allows a user to train the intramuscular injection with the similar conditions as provided by the real human body, and thereby to increase their proficiency in theory and practice, resulting in development in their medical skills.

In addition, the buttocks intramuscular injection training model enables the user to visibly confirm the shapes and locations of bones required to determine the injection site, and thus increase the learning effect. Also, the buttocks intramuscular injection training model can precisely detect the location and depth of the needle and provide a training result to the user by simulating the detection result, so that the user and an inspector can immediately check and evaluate the training result.

Moreover, the buttocks intramuscular injection training model allows the user to train the injection of real injection liquid to the muscle layer of the model hip, as well as the insertion of a needle into the hip model, and discharges the injected injection liquid through the drain means, so that the user can repeatedly perform injection practice, and thus can increase the efficiency of learning. Further, it is possible to evaluate the injection techniques objectively.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A buttocks intramuscular injection training model comprising:
   a hip model having a similar shape to a human hip;
   injection modules inserted into both sides of the hip model, wherein the injection modules are formed in the shape of a closed container with a drain outlet provided on one side and comprising a plurality of electrode layers and a muscle layer; wherein the plurality of electrode layers are used to detect a needle penetrating the plurality of electrode layers, further wherein the muscle layer is configured to receive injection liquid injected by the needle, and is interposed between the plurality of electrode layers;

a controller connected to the plurality of electrode layers; the controller configured to detect a location of the needle;

an input and output device wired or wirelessly connected to the controller for bidirectional communication with the controller and configured to visibly output the location of the needle;

a drain module comprising a pump connected to the controller;

an introduction tube that connects the pump to the drain outlet to transfer the injection liquid from the muscle layer to the pump;

a drain tube to discharge the injection liquid out of the pump; and light emitting means to emit light, wherein the light emitting means are installed at positions corresponding to an anterior superior iliac spine, a posterior superior iliac spine, an iliac crest, and a greater trochanter of the hip model.

2. The buttocks intramuscular injection training model of claim 1, further comprising:

a supporting member comprising
a hollow portion with a hole of the same shape as a cross-section of the hip model allowing for the hip model to be inserted into the supporting member, and
a plurality of protruding parts, each of which protects outwardly from the hollow portion,
wherein, when the hip model is inserted into the hollow portion and laid on a side, the hip model is supported by the protruding parts and its position can be varied during injection training.

\* \* \* \* \*